March 18, 1952      H. R. HORNING      2,589,257

ROAD-FINISHING MACHINE

Filed July 1, 1948      6 Sheets—Sheet 1

INVENTOR.
Harold R. Horning.
BY
ATTORNEYS

INVENTOR.
Harold R. Horning.
BY
ATTORNEYS

March 18, 1952     H. R. HORNING     2,589,257
ROAD-FINISHING MACHINE
Filed July 1, 1948     6 Sheets-Sheet 4

Fig. 9

INVENTOR.
Harold R. Horning.
BY
ATTORNEYS

March 18, 1952 H. R. HORNING 2,589,257
ROAD-FINISHING MACHINE
Filed July 1, 1948 6 Sheets-Sheet 5

INVENTOR.
Harold R. Horning
BY
ATTORNEYS

Patented Mar. 18, 1952

2,589,257

UNITED STATES PATENT OFFICE 2,589,257

ROAD-FINISHING MACHINE

Harold R. Horning, Columbus, Ohio, assignor to
The Jaeger Machine Company, Columbus, Ohio,
a corporation of Ohio Application July 1, 1948, Serial No. 36,464

16 Claims. (Cl. 94—45)

1

My invention relates to a road-finishing machine. It has to do, more particularly, with a finishing machine provided with a screed structure having an associated oscillating cut-off and compactor member. The screed structure is designed for advancing into material which is deposited on the surface to be covered, such as black-top or concrete material, so as to cut-off such material, compact it, and level it to the desired thickness and crown to produce the finished layer of material.

This application is related to my co-pending application directed to Road-Paving Machine, Serial No. 36,463, filed July 1, 1948.

One of the objects of my invention is to provide a road-finishing machine with a screed structure of such design that as it advances through the material, it will direct the material downwardly and rearwardly under the smoothing surface of the screed and will compact it effectively as it is guided under such surface.

Another object of my invention is to provide a screed structure which has a cut-off and compactor bar at the forward side thereof which engages the material, the bar being so shaped that it will effectively agitate the material as it advances thereinto and is being oscillated but will also guide the material rearwardly and downwardly and compact it during this guiding action, rather than merely agitate the material and tend to force it forwardly, and will eventually cut it off at the level of the smoothing surface of the screed.

Still another object of my invention is to provide a screed structure of the type indicated having a cut-off bar and compactor with a serrated edge for engaging the material, the serrated edge being disposed in a fixed angular position relative to the final smoothing surface of the screed so as to guide the material downwardly and rearwardly beneath such surface.

A further object of my invention is to provide a screed structure of the type indicated wherein the cut-off bar and compactor is supported for horizontal oscillation relative to the final smoothing surface of the screed so as to effectively agitate the material which its serrated edge engages and to compact it and guide it beneath such smoothing surface.

Another object of my invention is to provide a screed structure of the type indicated above wherein both the serrated cut-off and compactor bar and the finishing surface can be adjusted

2 readily to provide for different crowns without interfering with the bar oscillating means.

An additional object of my invention is to provide a screed structure of the type indicated wherein the cut-off bar and compactor is supported from the screed structure for oscillation by means including bearing structures which permit the oscillation but require no lubrication.

An additional object of my invention is to provide a screed structure of the type indicated above having means associated therewith for effectively heating the serrated cut-off bar thereof and the finishing surface thereof so that the screed can effectively operate on black-top or similar material.

Another object of my invention is to provide a finishing machine having flexible cushioning means for suspending a screed structure therefrom in working position which means is adjustable readily to vary the amount of weight applied by the screed structure to the material upon which it is acting.

Another object of my invention is to provide a finishing machine having means for suspending the screed structure therefrom in such a manner that it can be quickly and easily raised to inoperative position for transportation or lowered to operative position for acting upon the material.

Various other objects will be apparent from the drawings and the following description.

In general, the finishing machine of my invention includes a screed structure which will act on material deposited on the surface to be covered in front thereof and which is preferably associated with a material receiving and spreading unit. The latter unit may be of any suitable type and the detailed structure thereof does not form a part of this invention. For example, it may be a tractor type unit with conveyors thereon for receiving the material from a dump-truck at the front of the unit, which will convey the material rearwardly and deposit it in front of a driven spreading member supported by the unit and extending transversely of the surface, such member serving to spread the material transversely. The spread material will be acted upon by the screed structure of my invention which is supported from the tractor unit at the rear thereof and extends transversely of such unit.

The screed structure of my machine is suspended from the tractor unit by a cable arrangement which permits the entire structure to be lowered quickly into operative position relative to the surface to be covered or to be raised to inoperative position for transportation. When in operative position, the screed structure is suspended at its ends by a cable and pulley arrangement which has a cushioning unit incorporated therein that will provide for yieldable suspension of the screed structure from the tractor. This cable and pulley arrangement is provided with adjustable ratchet units at each end of the screed structure whereby the resistance of such cushioning unit can be varied so that more or less of the weight of the screed structure will be supported from the tractor unit and, therefore, the amount of weight acting on the material being finished can be varied. The means for supporting the screed structure from the tractor unit includes pivoted drag links which serve to drag the screed structure along with the tractor unit and which also serve to keep the screed structure substantially vertical preventing it from tipping forwardly or rearwardly. These links permit the necessary vertical movement of the screed structure. The screed structure includes a forward vertically disposed plate extending the full width thereof which serves to engage the material as the machine advances and to protect the mechanism of the screed structure from the material. The lower edge of this plate is inclined rearwardly and downwardly for deflecting the material under the screed structure. Directly behind this inclined edge of the plate is the cutter bar and compactor which is provided with a serrated or toothed forward edge that is inclined rearwardly and downwardly to the same extent as the lower edge of the material-engaging plate. Directly behind the cutter bar is the surfacing member of the screed which embodies a flat horizontally disposed plate that is at the same level as the extreme lower edge of the serrated cutter bar and extends rearwardly therefrom. Thus, the cutter bar is disposed between the front vertically disposed material-engaging plate and the rear horizontally disposed surfacing plate. The cutter bar is suspended from the main screed structure by hanger links of the pendulum type which can swing transversely and which are located behind the front plate that protects them from the material. These links are provided with novel pivots or bearings at each end which require no lubrication. Thus, the cutter bar is supported for horizontal oscillation and it is oscillated by an eccentric mechanism which may be driven by a flexible power-take-off drive from the tractor unit, such drive permitting the necessary vertical movement of the screed structure. The surfacing plate is supported from the main screed structure by independently adjustable thrust rods which can be adjusted to bow it to the proper crown. Also, the cutter bar is made in several independent sections to permit relative angular adjustment in accordance with the crown imparted to the surfacing plate, this adjustment being accomplished by vertical adjustment of the pivot supports for the pendulum links which are disposed at the ends of said sections. This adjustment can be made without interfering with the eccentric drive for oscillating the cutter bar. A heat conducting duct is associated with the surfacing plate and the cutter bar for heating such members and a heating system is provided on the machine for supplying heat to such duct. At the ends of the transverse screed structure, side edging plates are provided which are supported for free vertical movement or floating movement relative to the screed structure and which serve to form straight edges on the finished layer of material.

The preferred embodiment of my invention is illustrated in the accompanying drawings wherein similar characters of reference designate corresponding parts and wherein.

Figure 1:
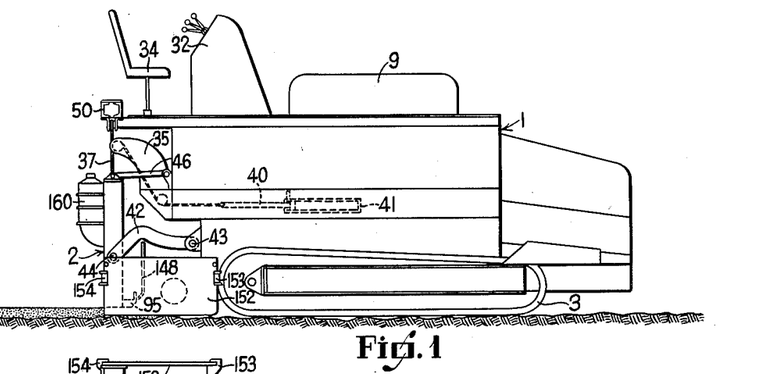
Figure 1 is a side elevational view of a road-finishing machine embodying my invention.
Figure 2:
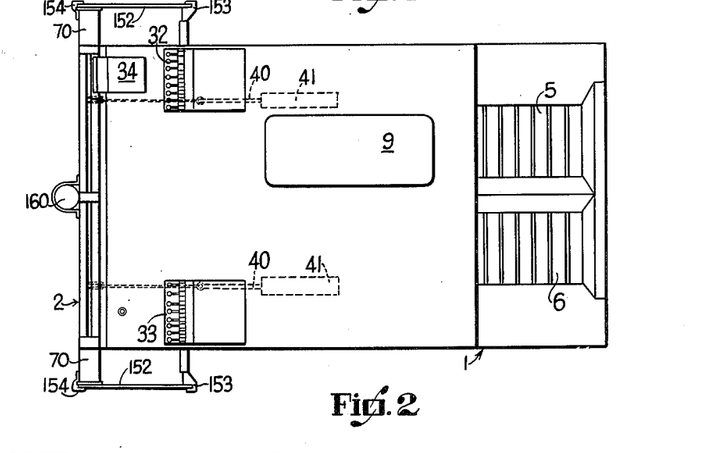
Figure 2 is a plan view of the machine of Figure 1.
Figure 3:
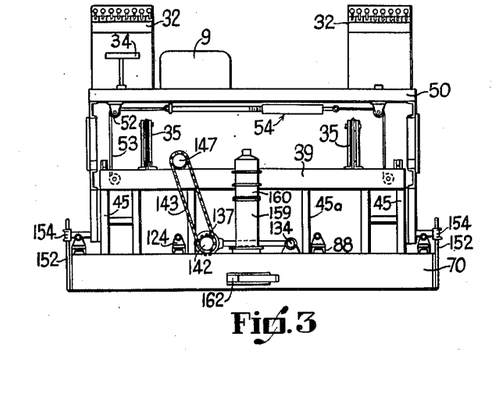
Figure 3 is an end elevational view of the machine.

With reference to the drawings, in Figures 1 to 3, inclusive, I have illustrated generally a finishing machine in which my invention may be incorporated. The machine comprises a tractor unit 1 having a screed structure 2 associated with the rear end thereof and extending transversely thereof. The tractor unit 1 may be of any suitable type but preferably is of such a type that it will receive material from a dump truck, carry it rearwardly and deposit it on the surface in front of the screed structure 2. The unit 1 will travel on the surface to be covered while the screed structure 2 will engage the surfacing material and produce the desired finished surface thereon.

The tractor 1 includes the power-driven crawlers 3 and 4 which run on the surface to be covered. It also includes the pair of conveyors 5 and 6 which extend from the front thereof to the rear thereof and which are adapted to receive the material and to conduct it rearwardly of the tractor where it is deposited on the surface in front of the screed structure. The material discharged from the conveyors 5 and 6 is deposited in front of a rotatable spreading member, supported by tractor unit 1 at the rear thereof, which includes the sections 7 and 8 composed of helically arranged blades which serve to feed the material transversely in opposite directions. Thus, the sections 7 and 8 of the spreading member will spread the material across the surface before it is engaged by the screed structure 2.

Figure 4:
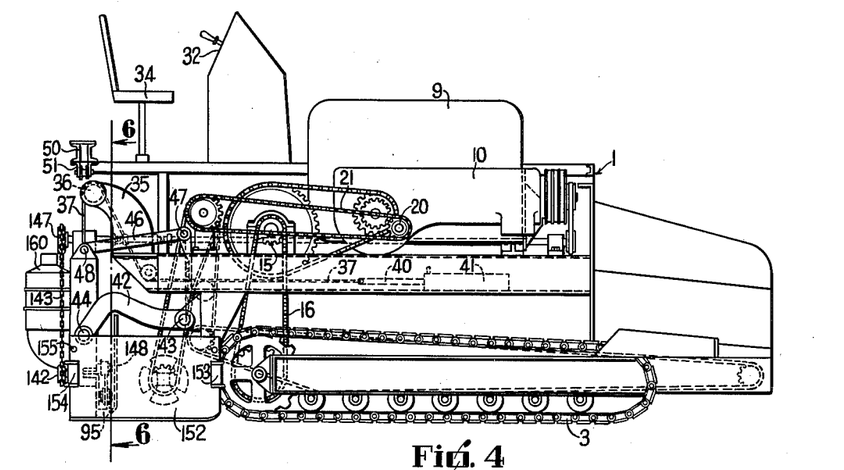
Figure 4 is a side elevational view of the machine illustrating the driving mechanism and the screed-supporting means thereof.
Figure 5:
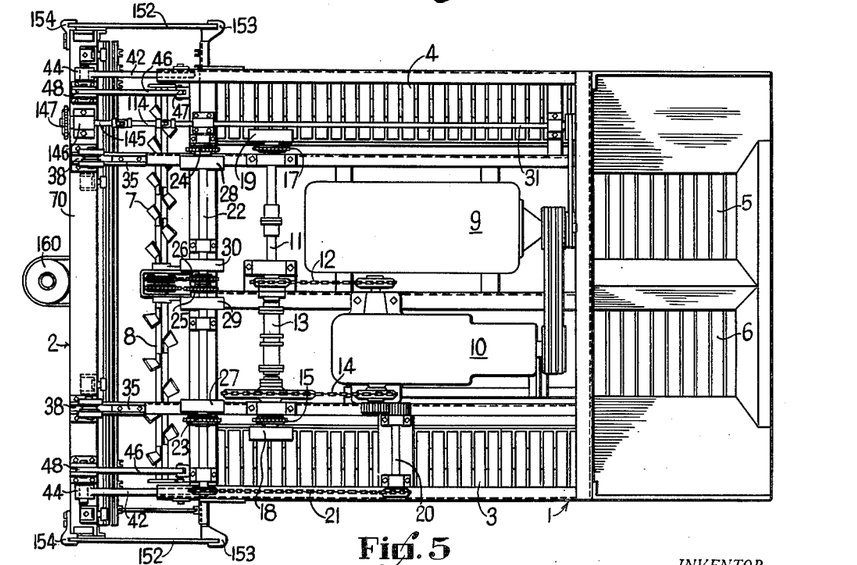
Figure 5 is a plan view of the machine with cover plates removed to show certain mechanism thereof.

As shown best in Figures 4 and 5, driving means is preferably provided on unit 1 for driving the crawlers 3 and 4 independently, for driving the conveyors 5 and 6 independently and for driving the sections 7 and 8 of the spreader member independently. This driving mechanism includes a motor 9 which drives a transmission unit 10. The unit 10 drives a transverse shaft 11 by means of a chain drive 12 and also drives a sleeve 13, rotatable on the shaft 11, by means of a chain drive 14. The sleeve 13 drives the crawler 4 through the medium of a sprocket 15 carried thereby which is drivingly connected to the crawler 4 by means of the chain 16, while the shaft 11 drives the crawler 3 through a similar chain drive including the sprocket 17 carried thereby. Associated with the sprocket 15 is a clutch 18 and associated with the sprocket 17 is a clutch 19 by means of which either of the crawler drives may be rendered operative or inoperative. The transmission 10 also drives a short shaft 20 which drives a sprocket drive 21 that, in turn, drives a shaft 22 which extends almost completely across the unit 1 at the rear side thereof. This shaft 22 serves to drive various sprocket and chain drives similar to the drive 16. These drives include sprockets 23 and 24, carried by the shaft 22 towards its ends, and a pair of sprockets 25 and 26, carried substantially midway of the ends of the shaft. The sprocket 23 will drive the conveyor 6 and the sprocket 24 will drive the conveyor 5. The middle sprocket 25 serves to drive the section 8 of the spreading member while the adjacent sprocket 26 serves to drive the section 7 of the spreading member. Associated with the sprockets 23, 24, 25 and 26 are the clutches 27, 28, 29 and 30, respectively, by means of which any of the sprockets may be coupled to or uncoupled from the shaft 22. Thus, either section 6 or 7 of the spreader member can be actuated independently, or either of the conveyors 5 or 6 can be driven independently. The independently controlled drives for the crawlers 3 and 4 provide means for steering the machine while the independently controlled drives for the conveyors 5 and 6 and the spreader sections 7 and 8 provide means for varying the amount of material supplied at each side of the screed structure 2. The motor 9 also drives a rearwardly extending shaft 31 at one side of the unit 1 which is provided for a purpose to be described later. All of the clutches are preferably controlled from a bank of controls 32 (Figures 2 and 3) which is provided at one side of the machine or from a bank of controls 33 which is provided at the other side of the machine. An operator's seat 34 is preferably removably supported at the rear of the unit 1 so that it may be positioned adjacent either the controls 32 or the controls 33 to obtain good visibility at either side of the machine.

As previously indicated, the screed structure 2 is disposed at the rear of the unit 1 and extends transversely thereof. The frame of the unit 1 is provided with upwardly and rearwardly extending supporting arms 35 at each side of the frame as shown in Figures 1, 3 and 4. Each of the arms 35 carries a pulley 36 about which a cable 37 is passed. The lower ends of cables 37 are connected at 38 to the upper transverse beam 39 of the frame of the screed structure 2, as shown best in Figure 6. As shown best in Figure 2, the opposite end of each of the cables 37 is connected to a piston rod 40 of a hydraulic cylinder and piston unit 41 disposed at each side of the frame of the unit 1 a substantial distance forwardly of the rear end thereof. These hydraulic cylinders 41 are provided with the usual valve controls and it will be apparent that they may be actuated to quickly raise or lower the entire screed structure. This cable arrangement provides for supporting the screed structure from the unit 1 for transportation or for lowering it into operative position.

Figure 6:
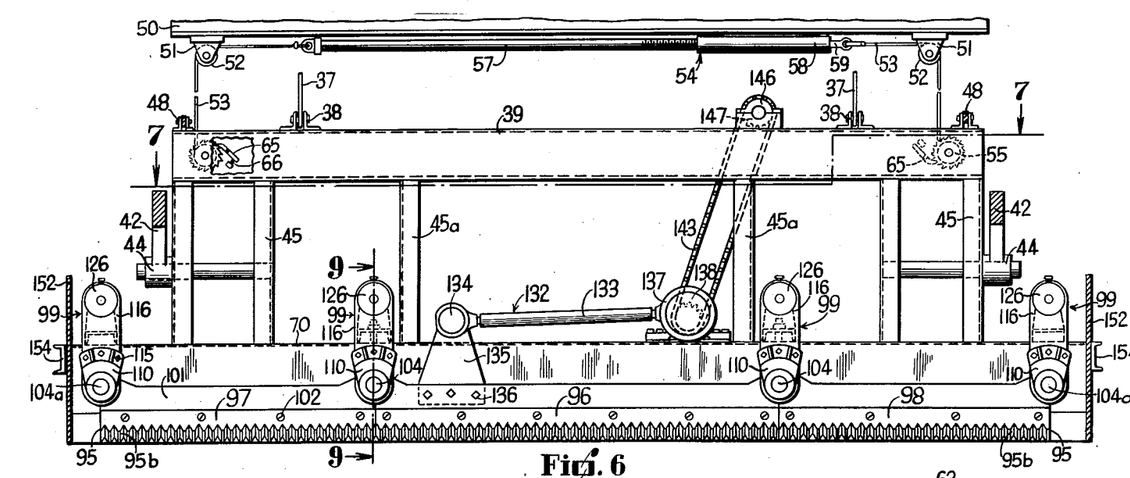
Figure 6 is a vertical sectional view through the screed structure, along line 6—6 of Figure 4 showing the means for suspending and oscilating the cut-off and compactor bar.

The screed structure 2 is connected to the unit 1 by drag links which permit the necessary relative vertical movement between the unit 1 and the screed structure 2. A lower drag link 42 is provided at each side of the unit 1, as shown best in Figures 1, 4 and 5, and is pivoted to the frame thereof for vertical movement, as at 43. The rear end of the drag link 42 is pivoted to the screed structure 2 by means of a pin 44 carried by a pair of upstanding arms 45, as shown in Figure 6, which form a part of the screed structure frame and are rigidly connected at their upper ends to the beam 39. To prevent undue tilting of the screed structure 2, an upper drag link 46 is provided at each side of the unit 1 with its forward end pivoted to the frame thereof, as at 47. The rear end of the link 46 is pivoted at 48 to the transverse beam 39 of the screed structure frame adjacent the end thereof. Thus, the screed structure 2 will be pulled along with the unit 1 by the lines 42 and 46 and the unit 1 will be free to move vertically relative to the unit 2 without affecting such unit. This is advantageous since the unit 1 will operate on the relatively rough surface to be covered. Furthermore, vertical movement of the unit 2 relative to the unit 1 created by actuation of the hydraulic cylinders 41 will be permitted.

An additional cable and pulley arrangement is provided for yieldably suspending the screed structure 2 in operative position to act on the material to be finished. This structure is shown best in Figures 1, 3, 4, 6 and 8. With reference to Figure 4, it will be noted that the upper part of the frame of the unit 1 is extended slightly beyond the rear ends of the arms 35 and supports a transverse beam 50. As shown best in Figure 6, suspended from each end of this beam by a bracket 51 is a pulley 52. Around each of these pulleys passes a cable 53. The upper ends of these cables are directed inwardly towards each other and are connected to an adjustable cushioning unit 54. The lower end of each of these cables is anchored to a drum 55 (Figures 6 and 7) carried by the beam 39 of the screed structure 2 adjacent the end of such beam and having a ratchet 56 associated therewith.

Figure 8:
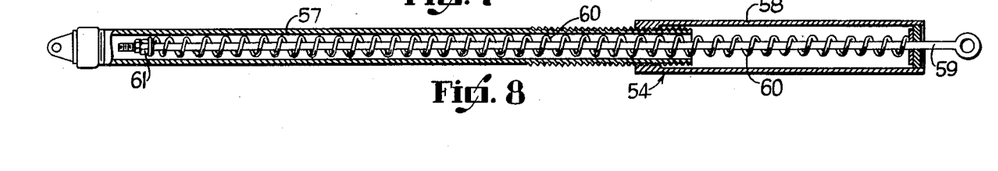
Figure 8 is a horizontal sectional view through a cushioning unit used in the yieldable suspension of the screed structure from the machine.

The unit 54 is transversely disposed beneath the beam 50 of unit 1 and, as shown in Figure 8, includes a housing composed of telescoping tubular sections 57 and 58, the section 57 threading into the section 58. The outer end of the section 57 is connected to the end of the left-hand cable 53 (Figure 6) while the right-hand cable 53 is connected to the end of a rod 59 extending outwardly from the section 58. The rod 59 is slidably mounted in the end of the section 58 and extends into the section 57 having a compression spring 60 surrounding it. At one end this spring bears against the head of section 58 and at its other end it bears against a stop nut 61 provided on the rod 59. The spring 60 may be compressed to the desired extent by threading section 57 into or out of the section 58.

The drums 55 are rotatably carried by the flanges of the beam 39 and may be rotated by means of cranks applied to the ends 63 of the supporting shafts thereof. These shafts 63 carry ratchet gears 64 (Figures 6 and 7) which are engaged by pawls 65 normally held in engagement therewith by springs 66. Thus, normally the drums 55 are prevented from rotating. However, they may be rotated when the pawls 65 are released. Rotation of the drums 55 will either further compress the spring 60 or permit it to expand, depending upon the direction of rotation of the drums. Either drum may be rotated independently. Thus, the resistance of the spring 60 may be varied readily. The drums should be so adjusted that a portion of the weight of the screed structure 2 will be supported from the unit 1 by the cables 53. However, the screed structure should contact the material with sufficient weight to properly compress and finish the surface thereof.

The screed structure itself is illustrated best in Figures 6 to 11, inclusive. The frame of this structure includes the transverse beam 39 and the upstanding arms 45, previously mentioned. The lower ends of the arms 45 are welded or otherwise suitably secured to the top surface of a transversely extending inverted channel member 70 which extends beyond the outermost arms 45. Additional intermediate supports 45a may also be provided. This member 70 serves to adjustably support the surfacing plate 71 of the screed structure. The plate 71 is flat and horizontally disposed, as shown best in Figure 9, and is provided with an upstanding flange 72 at its rear edge. The forward edge has welded thereto a bar 73 of square cross-section. The plate 71 is secured to upstanding plates 74 and 75 disposed at its forward and rear edges and which are held in spaced relationship by sleeves 76 welded to the plates 74 and 75. Bolts 77 are passed through the sleeves and through aligning openings in the bar 73 and flange 72. It will be apparent that these sleeves and bolt units will be provided at suitably spaced intervals along the plate 71. Spaced above the sleeves 76 are sleeves 78 which are also welded to the plates 74 and 75. These sleeves receive transversely extending clamping bolts 79 which pass through aligning openings in the plates 74 and 75 and through vertical slots 80 in the depending flanges 81 of the channel 70. The forward ends of the clamping bolts 79 also pass through aligning openings in a vertically disposed plate 82 adjacent the lower edge thereof. This plate is provided in front of the forward flange 81 of channel 70 and extends upwardly above the top thereof having a rearwardly directed supporting flange 83. Welded to each of the sleeves 78 is the lower end of a thrust rod 84. Each of these upstanding rods 84 extends upwardly through an opening in a plate 85 and through an opening 86 in the top plate of the channel 70. It will be noted that the plate 85 is disposed above the lower edges of flange 81 of channel 70 and is bolted thereto as at 87. Each rod extends beyond the upper plate of channel 70 through an opening 86a provided in an inverted channel 88 which extends transversely of member 70 and is welded to the upper surface thereof. In the opening 87 a grooved collar 89 is disposed. The groove of this collar is engaged on opposite sides by the notched bars 90 which are transversely disposed on opposite sides of the collar 89 and are secured to the channel 88 by bolts 91. The arrangement of these bars is illustrated well in Figure 7. Above the collar 89 and formed as an integral part thereof is a nut 92. The collar is threaded on the threaded upper end 93 of the rod 84. It will be apparent that the rods 84, arranged at intervals along the channel 70, serve to suspend the surfacing plate 71 from the channel in such a manner that the surfacing plate 71 can be bowed to the proper crown desired to be imparted to the surface of the material being finished.

Figure 7:
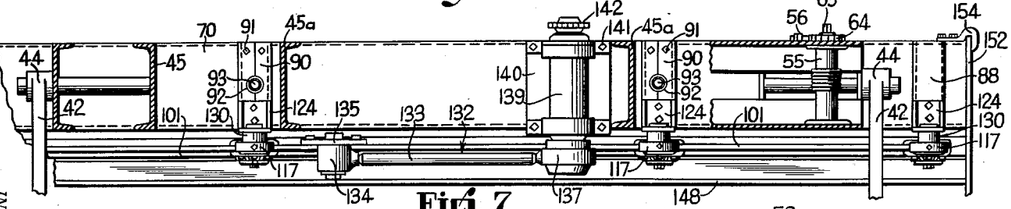
Figure 7 is a horizontal sectional view taken substantially along line 7—7 of Figure 6.

In adjusting the crown, it is merely necessary to apply a wrench to the nuts 92 of collars 89 of the various thrust rod units, two of such units being shown in Figure 7 spaced inwardly from opposite ends of the channel 70. Any desired number of these units, however, may be provided. Adjustment of the nuts 92 will exert a thrust or pull on the rods 84 which will transmit such force to the sleeve 78 which will, in turn, transmit the force to the plates 74 and 75 and the plate 71, the latter three plates being joined together as a single unit. This last-mentioned unit will, therefore, be bowed to the proper crown. During this adjustment the nuts 79a on the bolts 79 will be loosened to permit movement of the plates 74 and 75 relative to the flanges 81 of channel 70 and as soon as the adjustment is completed, the nuts will be tightened to clamp these various members together. Vertical movement of plate 74 will result in corresponding movement of the plate 82. Thus, the surfacing plate 71 can have the proper crown imparted thereto by a simple adjustment.

Directly in front of the surfacing plate 71 is the transversely extending cutter bar 95 which is supported for transverse oscillation relative to the stationary plate 71. As shown in Figure 6, the cutter bar is composed of several sections to permit adjustment in accordance with the crowning of the plate 71, three sections being shown, that is, a middle section 96, a left-hand section 97, and a right-hand section 98. Each section of the cutter bar is provided with a flat rear surface 95a which bears against the forward surface of the bar 73 secured to the forward edge of plate 71. The forward edge of each section is provided with teeth or serrations 95b which are preferably disposed at an angle of approximately 45° relative to the flat plate 71. In other words, the serrated edge of the cutter bar is directed rearwardly and downwardly at an angle of about 45°. In order to permit oscillation of the cutter bar, its sections are suspended from the plates 82 by means of the pendulum link units 99. As shown in Figure 6, one of these units is disposed at the outer end of the cutter bar section 97, another at the adjacent ends of sections 97 and 96, another at the adjacent ends of the sections 96 and 98, and another at the outer end of section 98. However, the number of these units 99 will depend upon the number of sections of the cutter bar, which can be varied.

Figure 9:
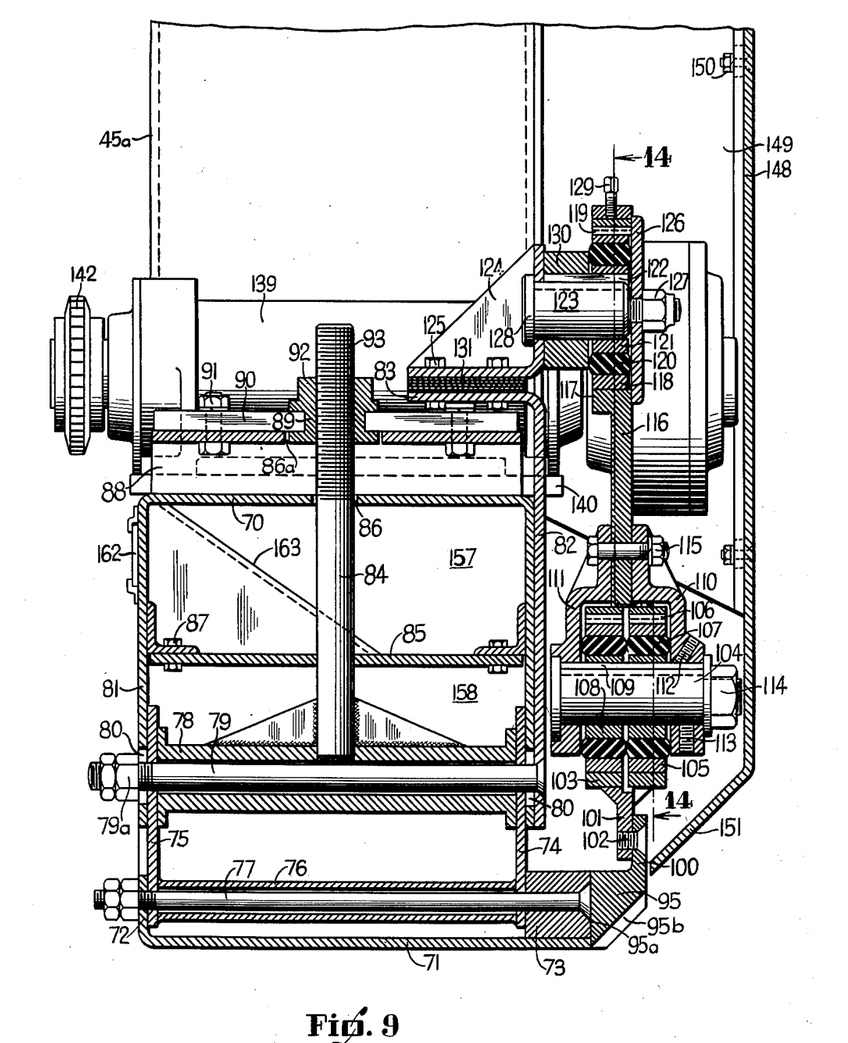
Figure 9 is an enlarged transverse section through the screed structure taken substantially along line 9—9 of Figure 6.
Figure 10:
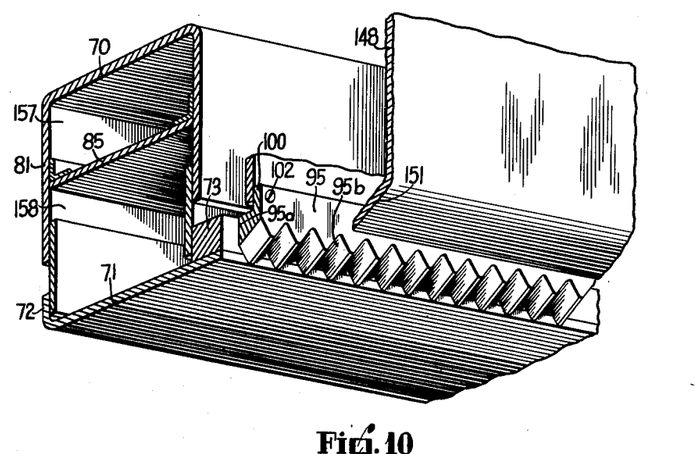
Figure 10 is a perspective view of a section of the screed structure at the lower side thereof illustrating the cutter bar and compactor and the associated surfacing member of the screed.

It will be noted best from Figures 9 and 10 that each of the cutter bar sections is provided with an upstanding forward flange 100 which is removably bolted to a plate 101, these plates being provided in the same number as the cutter bar sections and being substantially of the same lengths. The cutter bar flanges 100 are bolted to the plates 101 by removable bolts 102 so that the cutter bar sections can be removed and replaced when desired. As shown best in Figures 6, 7, 9 and 14, the ends of the plates 101 are provided with integral collars 103, the collars being associated with the suspending link units 99. It will be noted from Figures 9 and 14 that at the adjacent ends of plates 101, that is, at the junction of sections 96 and 97 and at the junction of sections 96 and 98 of the cutter bar, the collars 103 are offset relative to each other so that they can be supported by the same pivot 104 but still the adjacent cutter bar sections will be in alignment with each other, presenting a continuous serrated edge at the forward side of the screed for engaging the material. The outer ends of sections 97 and 98 of the cutter bar are supported from the links 99 in the same manner as the inner ends thereof and the ends of sections 96 are supported, which support is shown in Figures 9 and 14 in detail, except that only one collar 103 will be provided at these pivot points 104a (Figure 6).

Figure 14:
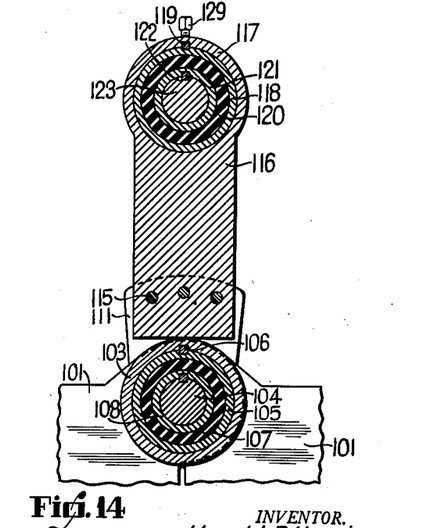
Figure 14 is a section taken along line 14—14 of Figure 9 illustrating one of the cutter bar suspending links, and associated parts.

With reference to Figures 9 and 14, it will be apparent that each collar 103 is provided with a bushing 105 keyed thereto by a key 106. Within the bushing 105 is a rubber sleeve 107 and within the sleeve 107 is a bushing 108 keyed to the pivot pin 104 by means of a key 109. The rubber sleeve 107 is molded between the bushings 105 and 108 and adheres thereto so that it will not rotate relative thereto. The pin 104 is disposed in openings formed in the supporting brackets 110 and 111 disposed at opposite sides of the collars 103. The pin 104 is prevented from rotating in these brackets by means of set screws 112 and 113 and is prevented from axial movement by a nut 114. The brackets 110 and 111 are bolted in clamping relationship by means of a plurality of bolts 115 to the lower end of a bar 116 which forms a part of each of the link units 99. Tightening of the nuts 115 and the nut 114 will cause the two adjacent rubber sleeves 107 to frictionally engage each other and each sleeve to engage the adjacent plate 110 or 111.

The upper end of each bar 116 has a collar 117 formed integral therewith. Within this collar is a bushing 118 which is keyed thereto by a key 119. Within the bushing 118 is a rubber sleeve 120 and within the sleeve 120 is a bushing 121, the rubber sleeve being molded between and adhering to the two bushings so as not to rotate relative thereto. The bushing 121 is keyed by a key 122 to a pin 123. The pin 123 is supported by a bracket 124 which is bolted by means of bolts 125 to the rearwardly extending flange 83 of the vertical plate 82. A cover and clamping plate 126 is held on the outer end of the pin 123 by means of a nut 127. A flange 128 on the opposite end of the pin 123 limits axial movement thereof to the right, as shown in Figure 9. Axial movement of bushing 118 relative to collar 117 is precluded by a screw 129. When nut 127 is tightened, the plate 126 engages rubber sleeve 120 and causes it to also engage a spacer sleeve 130 provided behind the bushing structure in contact with the forward side of bracket 124. It will be apparent that with this arrangement I have provided a yieldable pivot structure associated with upper pin 123 and a yieldable pivot structure associated with lower pin 112. In each case, the pivot structure is not a free pivot structure, with relatively rotatable metal parts which would require lubrication, but yields sufficiently, due to the provision of the rubber sleeves 120 and 107. The parts do not rotate relatively but the material of the rubber sleeves will yield sufficiently to permit the necessary limited movement about the axes of the pins. Furthermore, no lubrication is required.

As previously indicated when the plate 71 is bowed, the vertical plate 82 is moved vertically to a slight extent. In order to adjust the cutter bar sections relatively in accordance with the crown imparted to the surfacing plate 71, the supporting brackets 124 for the pendulum link units 99 can be adjusted vertically. This is accomplished by removing the bolts 125, which bolt the brackets 124 to the flange 83, and varying the number of shims 131 provided between each bracket and the flange. This will raise or lower the pin 123 supported by the bracket 124 and the associated link structure. It usually will only be necessary to adjust the two intermediate link units 99. This will change the angle of section 96 relative to sections 97 and 98, these sections having a slight space between their adjacent ends (Figure 14).

Oscillation of the cutter bar 95 relative to the surfacing plate 71 is accomplished by means of an eccentric drive 132 which is illustrated best in Figures 3, 5, 6 and 7. This drive includes a pitman 133 which is pivotally connected as at 134 to an upstanding bracket 135 bolted by bolts 136 to the center plate 101 of the cutter bar structure. The opposite end of this pitman 133 is provided with a collar 137 which receives the rotatable eccentric 138. This eccentric is keyed on a shaft which is rotatably mounted in a bearing sleeve 139 that is provided with a supporting base 140 bolted by bolts 141 to the upper surface of the channel 70. The opposite end of the eccentric supporting shaft carries a sprocket 142 which is driven by a chain 143. This chain 143, as shown best in Figure 5, is driven by means of the shaft 31 which extends rearwardly from the tractor unit 1. The rear end of the shaft 31 is connected by a universal connection to a short shaft section 144 which is connected by a universal connection to a stub shaft 145 which is rotatably carried in a bearing 146 secured on the cross beam 59 at the rear of the unit 1. The rear end of this shaft 145 carries the sprocket 147 which drives the chain 143. Thus, the eccentric drive 132 will be driven from the power unit on the tractor unit 1 by a flexible connection which will permit vertical movement of the screed structure 2 relative to the unit 1. The eccentric drive is such that the cutter bar will be oscillated at a very high speed relative to the surfacing plate.

Disposed directly ahead of the link units 99, which suspend the cutter bar, and the eccentric drive 132 is a vertically disposed material-engaging plate 148 which protects this mechanism. This plate 148 by forwardly extending thrust members 149 which are disposed between the plate 148 and the upstanding supports 45 and 45a of the screed frame structure to which the members 149 may be welded or otherwise suitably secured. The plate 148 is connected to the members 149 by bolt and slot connections 150 so that the plate 148 is vertically adjustable. This plate 148 may be formed in sections corresponding in number and lengths to the cutter bar section. The lower edge of the plate 148 is turned rearwardly and downwardly to provide an angularly disposed portion 151 which is preferably disposed at substantially the same angles as the teeth of the cutter bar. As the screed advances into the material, the plate 148 engages the material and its lower edge 151 directs the material downwardly beneath the cutter bar 95.

In order to prevent the material being acted on by the screed from spreading laterally beyond the ends of the screed, I provide the vertically disposed side plates 152 at the ends thereof which form straight edges on the layer of material finished by my machine. As shown best in Figure 5, these plates extend rearwardly from a point ahead of the rotatable spreading member carried by unit 1 to a point behind the surfacing plate 71 of the screed. The forward end of each plate is mounted for slidable vertical movement in a guide 153 carried by the frame of the unit 1, as shown best in Figures 4 and 5. The rear end of each plate is similarly disposed in a guide 154 which is bolted to the rear flange 81 of the channel 70 of the screed structure. These plates merely slide along the surface and move or float vertically in accordance with the irregularities thereof. Pins 155 are associated with the forward and rear upper corners of each of the plates 152 to prevent the plates from dropping from the guides 153 and 154 whenever the screed structure is raised for transportation.

Figure 12:
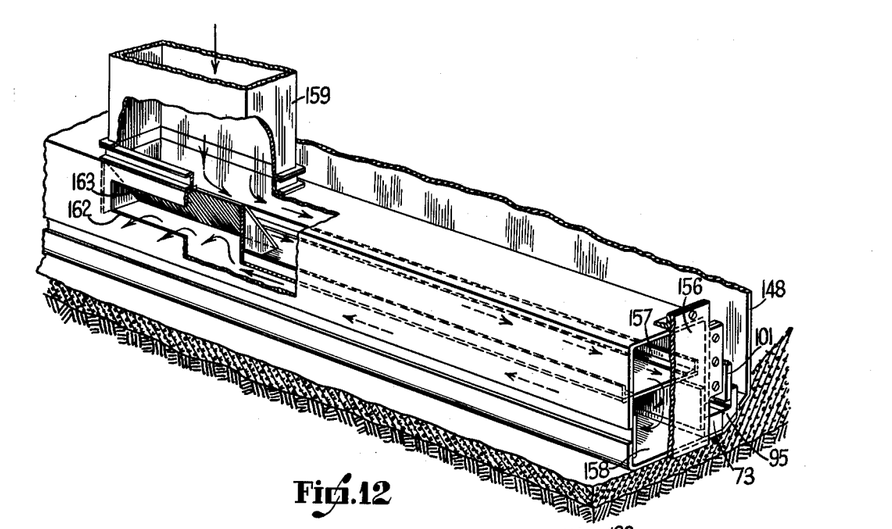
Figure 12 is a perspective view, partly cut away, showing the duct arrangement for heating the cutter bar and surfacing member of the screed structure.
Figure 13:
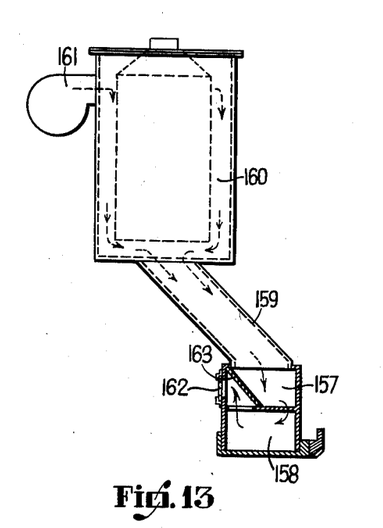
Figure 13 is a diagram illustrating a heater connected to the duct arrangement of the screed structure.

I also provide a heating system for heating the surfacing plate 71 and the cutter bar 95 so that it can operate satisfactorily on bituminous material. This structure is shown best in Figures 12 and 13. The plate 85 extends almost the full length of the channel 70 but one end is spaced slightly from the adjacent end thereof. The ends of the box-like screed structure formed by members 70, 71, 74 and 75 may be closed by plates 156 which are bolted to the channel 70. Thus, upper and lower heat conducting passageways 157 and 158 are provided within the screed structure, the one end of passageway 157 communicating with the corresponding end of passageway 158, as shown in Figure 12. The passageway 158 has its bottom wall formed by the plate 71. Consequently, when heating medium is passed through the lower passageway 158 the heat is conducted into plate 71 and from this plate into the contacting bar 73 and the cutter bar 95 which contacts with such bar 73. Heat is supplied to the upper passageway 157 by means of a vertical duct 159 which extends downwardly from a heating unit 160 and is connected to the passageway 157 through an opening provided in the top of the channel 70 intermediate the ends thereof. This heating unit 160 is supported on the upper beam 39 of the screed frame intermediate the ends thereof and may be of any suitable type preferably including a blower 161. An escape opening 162 for the heating fluid or gas may be provided behind a baffle plate 163 which is provided in the upper passageway 157. Thus, with this arrangement the heating medium forced into the passageway 157 will travel therethrough and then downwardly into the passageway 158, through this passageway and then out through the vent 162.

Figure 11:
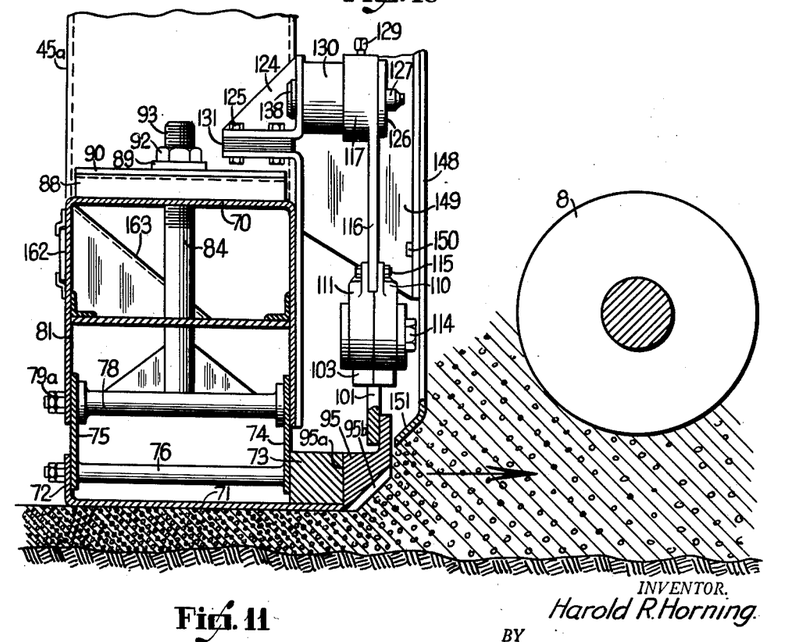
Figure 11 is a diagrammatic view illustrating how the screed structure will advance into the material and the oscillating cutter bar will guide it downwardly and rearwardly while compacting it until it is finally under the surfacing member of the screed.

In the operation of this machine, the hydraulic cylinders 41 will be actuated to lower the screed structure 2 to operative position. The screed structure will be suspended in such position by the cable arrangement which includes the cushioning unit 57 in such a manner that a proper amount of weight will be applied to the material being acted upon. As the unit 1 advances, it will pull the screed structure 2 along therewith, limited vertical movement of the screed structure and the unit 1 relatively being permitted by the drag link connecting structure including the links 42 and 46. The material supplied in front of the screed structure by the unit 1 will first be engaged by the plate 148, the thrust of this material being taken by thrust members 149 and the main frame of the screed structure. The material will be directed rearwardly and downwardly as shown in Figure 11 by the lower angular portion 151 of the plate 148. The cutter bar 95 will be oscillating at high speed and will engage and agitate the material being fed to it by portion 151 of plate 148. The thrust created on cutter bar 95 will be transmitted to bar 73. This agitation will aid in the feeding of the material beneath the cutter bar 95 which will gradually compress it and force it under the surfacing plate 71, cutting it off at the level of the surfacing plate 71. The plate 71 will then pass over the compacted material and will smooth it and surface it to proper contour. The crown of the plate 71 may be readily adjusted as previously indicated and the sections of the cutter bar 95 may be adjusted correspondingly. The ends of the cutter bar, as shown best in Figure 6, will be spaced from the side plates 152 to permit the required longitudinal movement of the cutter bar during oscillation thereof.

It will be apparent from the above description that the finishing machine which I have developed has many advantages. The screed structure thereof is such that as it advances through the material, it will agitate it, compact it and direct it under the moving surface of the screed at the same time that it is cutting the material off to the level of such smoothing surface. Because the cut-off bar is serrated, it more effectively agitates the material and since the teeth are disposed at an angle relative to the fixed smoothing plate, the material is gradually forced downwardly and rearwardly under such plate. Furthermore, since the surfacing plate and serrated cut-off bar are heated, the screed structure will act effectively on hot mix material. The oscillation of the cut-off bar is accomplished without undue vibration of the main screed structure due to the special link structure which is provided for suspending the cutter bar and which includes cushioning elements. The screed structure is suspended in an operative position by a cable structure which includes a cushioning unit that may be adjusted to vary the amount of weight applied to the material being acted upon. This weight may be adjusted for various materials which is important in the case of slow-curing materials which should not be compacted to an excessive degree, which might occur if all of the weight of the screed structure was applied to the material. Furthermore, the screed structure may be raised quickly into operative position for transportation by the tractor unit through the medium of the hydraulic cylinders and cable arrangement which I provide for this purpose.

Various other advantages will be apparent from the preceding description, the drawings and the following claims.

Having thus described my invention, what I claim is:

1. A finishing machine comprising a vehicle adapted to move along the surface to be finished, a screed structure adapted to act upon the material to be finished, means for suspending the screed structure from the vehicle, said means comprising a pair of cables having one of their ends connected to said screed structure and their opposite ends passing around guides carried by the vehicle and being connected to the opposite ends of a plunger unit, said unit including a rod connected to one of said cables and a housing connected to the other of said cables, and a compression spring disposed in said housing for resisting movement of the rod relative thereto in the direction which the weight of the screed structure tends to pull it.

2. Apparatus according to claim 1 wherein the housing is formed of telescoping sections of cylinders which have interfitting threaded ends.

3. Apparatus according to claim 1 wherein the ends of the cables are anchored to drums carried by said screed structure, and releasable means for normally preventing rotation of said drums but permitting rotation when desired to vary the extent of compression of said spring in said housing.

4. Apparatus according to claim 3 wherein said last-named means comprises releasable ratchets associated with said drums.

5. Apparatus according to claim 3 including a second cable arrangement for supporting the screed structure completely from the vehicle or for lowering it so it will be suspended by the first-named cable arrangement, said second cable arrangement comprising a pair of cables having one of their ends anchored to said screed structure and their opposite ends passing around pulleys supported by the vehicle and being connected to hydraulic cylinder units carried by said vehicle.

6. A screed structure comprising a transversely fixed surfacing member for imparting a smooth surface to the material being acted upon, a cutter bar disposed at the forward edge of said surfacing member, means for oscillating said cutter bar transversely relative to said surfacing member, said cutter bar having a serrated material-engaging face which is directed downwardly and rearwardly to a point substantially level with the lower surface and contiguous with the forward edge of said surfacing member, and a vertically disposed material-engaging plate in front of said cutter bar, said plate having its lower edge inclined downwardly and rearwardly so that it is substantially continuous with said face of said cutter bar and will direct the material thereto as the screed structure is forced into the material.

7. A screed structure according to claim 6 wherein the serrated face of the cutter bar is disposed at an angle of approximately 45° relative to the lower surface of the surfacing member and the inclined lower edge of said vertically disposed plate is arranged at a corresponding angle.

8. A screed structure comprising a supporting frame, a surfacing plate supported at the lower side of said frame in transversely fixed position for imparting a smooth surface to the material being acted upon, a cutter bar supported from said frame for horizontal oscillation transversely of the frame at the forward edge of said plate, means carried by said frame for oscillating said cutter bar, said cutter bar having a serrated material-engaging face which is directed downwardly and rearwardly to a point substantially level with the lower surface and contiguous with the forward edge of said surfacing plate, and a material-engaging plate in front of said cutter bar, said plate having its lower edge inclined downwardly and rearwardly so that it is substantially contiguous with said face of said cutter bar and will direct the material thereto as the screed structure is forced into the material.

9. A screed structure according to claim 8 wherein the face of the cutter bar and the inclined lower edge of said front plate are disposed at an angle of approximately 45° from the horizontal.

10. A screed structure comprising a supporting frame, a surfacing plate supported at the lower side of said frame in transversely fixed position for imparting a smooth surface to the material being acted upon, a cutter bar supported from said frame for horizontal oscillation transversely of the frame at the forward edge of said plate, means carried by the frame for oscillating said cutter bar, said cutter bar having a serrated material-engaging face which is directed downwardly and rearwardly to a point substantially level with the lower surface and contiguous with the forward edge of said surfacing plate, said cutter bar being suspended from the frame by pendulum links which are pivoted to the frame and to the cutter bar, the pivot points of said links including bearings embodying yieldable sleeves which permit oscillation of said links.

11. A screed structure according to claim 10 wherein the cutter bar is composed of several sections, some of said sections having their adjacent ends at the points where certain of said links are pivoted to said bar, and an adjustable support carrying said links and being supported on said frame for vertical adjustment to permit angular relative adjustment of said adjacent cutter bar sections.

12. A screed structure comprising a supporting frame, a surfacing plate supported at the lower side of said frame in transversely fixed position for imparting a smooth surface to the material being acted upon, a cutter bar supported from said frame for horizontal oscillation transversely of the frame at the forward edge of said plate, means carried by said frame for oscillating said cutter bar, said cutter bar having a serrated material-engaging face which is directed downwardly and rearwardly to a point substantially level with the lower surface and contiguous with the forward edge of said surfacing plate, said oscillating means includes an eccentric rotatably supported on said frame, a vehicle for carrying said screed structure, means for mounting the screed on the vehicle for vertical movement relative to the vehicle, a power unit on said vehicle, and a flexible driving connection between said power unit and said eccentric to permit such vertical movement.

13. A screed structure including a supporting frame, a material-engaging member supported by said frame, means for suspending said member from said frame and including links, a bearing provided at one end of each of said links, said bearing including a pair of axially spaced sleeves with a flexible sleeve interposed therebetween which will flex sufficiently to permit oscillation of said link, and means for oscillating said suspended member.

14. A structure according to claim 13 wherein the bearing includes two metal sleeves with a rubber sleeve interposed therebetween and being non-rotatable relative to said sleeves.

15. A structure according to claim 14 wherein one of said bearings is provided for connecting one end of each link to the said frame and one of said bearings is provided for connecting the other end of each link to said material-engaging member.

16. A structure according to claim 14 wherein the bearing carried by the frame is supported by a vertically adjustable bracket.

HAROLD R. HORNING.

REFERENCES CITED

The following references are of record in the file of this patent:

UNITED STATES PATENTS

| Number | Name | Date |
|---|---|---|
| 1,987,398 | Gardiner | Jan. 8, 1935 |
| 2,038,498 | Mosel | Apr. 21, 1936 |
| 2,127,485 | Owens et al. | Aug. 16, 1938 |
| 2,150,618 | Blackwell | Mar. 14, 1939 |
| 2,185,645 | Mosel | Jan. 2, 1940 |
| 2,226,466 | Heltzel | Dec. 24, 1940 |
| 2,235,105 | Heltzel | Mar. 18, 1941 |
| 2,244,297 | Heltzel | June 3, 1941 |
| 2,261,766 | Jackson | Nov. 4, 1941 |
| 2,312,968 | Heltzel | Mar. 2, 1943 |
| 2,473,961 | Mandt et al. | June 21, 1949 |